United States Patent [19]

Daimon

[11] Patent Number: 4,498,159
[45] Date of Patent: Feb. 5, 1985

[54] TRACK DEVIATION DETECTING APPARATUS

[75] Inventor: Masahiro Daimon, Amagasaki, Japan

[73] Assignee: Mitsubishi Denki Kabushiki Kaisha, Tokyo, Japan

[21] Appl. No.: 465,579

[22] Filed: Feb. 10, 1983

[30] Foreign Application Priority Data

Feb. 25, 1982 [JP] Japan .................................. 57-30796

[51] Int. Cl.³ .......................... G11B 7/00; G11B 21/00
[52] U.S. Cl. ...................................................... 369/44
[58] Field of Search .................................. 369/43–46, 369/109; 250/201–204; 358/342

[56] References Cited

U.S. PATENT DOCUMENTS 3,971,002 7/1976 Bricot et al. ....................... 369/46 X

FOREIGN PATENT DOCUMENTS 50954 of 1974 Japan .

OTHER PUBLICATIONS

SPIE, vol. 329, (1982), pp. 8–20, Optical Disk Technology.

Primary Examiner—Robert L. Richardson
Attorney, Agent, or Firm—Lowe, King, Price & Becker

[57] ABSTRACT

A track deviation detecting apparatus for detecting a deviation of a recording light spot (A) from a track (15) on a recording medium (7) comprises two diffraction gratings (2, 18) for producing two auxiliary spots (B1, C1) being led along light paths (30b1, 30c1), optical means comprising a light source (1), a collimator lens (17) and a condenser (6), and two optical detectors (20, 21) adapted to detect the respective reflected light rays from the auxiliary spots (B1, C1) on the recording medium (7). A positional relationship of two diffraction gratings (2, 18) and the optical means is arranged so that one of two auxiliary spots (B1, C1) is located on an unrecorded portion of the track (15) and at a lower edge (13) of the track (15), and the other is located on the unrecorded portion of the track (15) and at an upper edge of the track (15). The reflected light rays from two auxiliary spots (B1, C1) are led to the optical detectors (20, 21) installed correspondingly thereto, without being influenced by the record pits (16) formed by the spot of light (A). Thus, outputs from the optical detectors (20, 21) are differentially amplified by a differential amplifier (14) connected thereto, thereby making it possible to detect the amount and direction of the deviation of the spot of light (A) from the track (15) without being influenced by the record pits (16).

11 Claims, 5 Drawing Figures

PRIOR ART FIG. 1
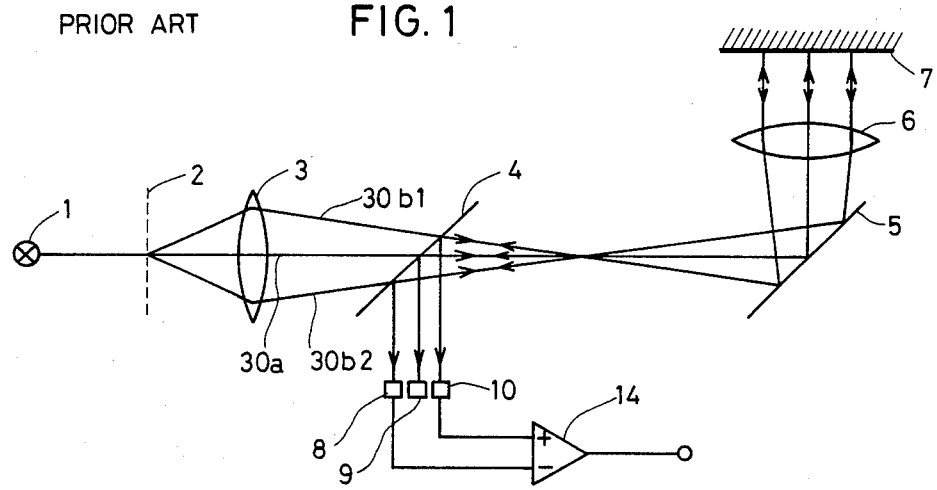
PRIOR ART FIG. 2
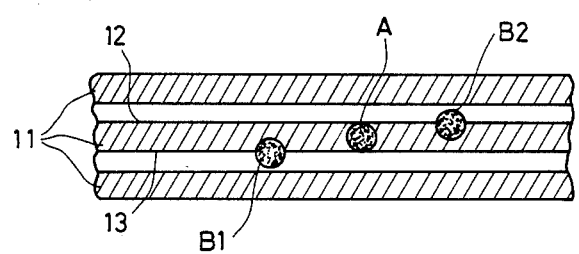
PRIOR ART FIG. 3
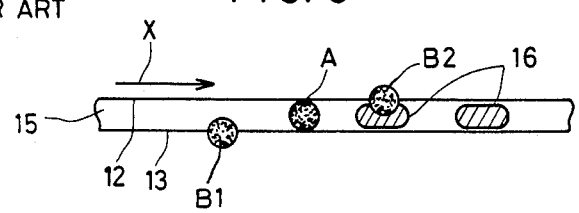

TRACK DEVIATION DETECTING APPARATUS

BACKGROUND OF THE INVENTION

1. Field of the Invention

This invention relates to a track deviation detecting apparatus for use with a device for optically making a record on a recording medium having guide grooves.

2. Description of the Prior Art

In order to enable a reading spot of light projected on a recording medium, such as an optical disk, video disk or digital audio disk, to accurately follow the tracks, it has been practiced to detect the relative position of the track and reading spot of light. As a reliable method for such detection, there has been proposed a twin-spot method which separates the light emitted from a light source into at least three beams of light (Japanese Patent Laying-Open No. 50954/1974, priority claimed on Dutch Patent Application No. 7206378).

FIG. 1 is a view showing the mechanism of such a conventional optical information reading device. In the figure, the light emitted from a light source 1 is separated into three beams of light by diffraction grating 2. The separated beams pass through a lens 3 and a half mirror 4 and is reflected by a rotary mirror 5 to travel to a condenser 6. The three beams of light are concentrated on a recording medium 7 as three spots of light by the condenser 6.

The three concentrated spots of light are reflected from the recording medium 7 and concentrated again by the condenser 6 and reflected by the rotary mirror 5 and half mirror 4. Thus, the reflected light rays from the three spots of light on the recording medium are guided to optical detectors 8, 9 and 10 corresponding to the respective spots of light.

The disposition of the three spots of light on the recording medium is shown in FIG. 2. Tracks 11 have upper and lower edges 12 and 13 and are formed on the recording medium 7 so that they extend parallel to the direction of travel of the recording medium. A spot of light A is formed by the diffracted light of the zeroth order from the diffraction grating; that is, it is the spot of light formed by the beam guided along an optical path 30a in FIG. 1 and concentrated on the recording medium 7 and serves to read the information recorded on the track. An auxiliary spot B1 is formed by the diffracted light of the plus first order from the diffraction grating; that is, it is the spot of light formed by the beam guided along an optical path 30b 1 in FIG. 1 and concentrated on the recording medium 7, and is concentrated on the lower edge 13 of the same track as that on which the spot of light A is concentrated. An auxiliary spot of light B2 is formed by the diffracted light of the minus first order from the diffraction grating; that is, it is the spot of light formed by the beam guided along an optical path 30b 2 in FIG. 1 and concentrated on the recording medium 7, and is concentrated on the upper edge 12 of the same track as that on which the spot of light A is concentrated. The centers of the spot of light A and auxiliary spots B1 and B2 are located on the same line, and the spacing between the spot of light A and the auxiliary spot B1 and the spacing between the spot of light A and the auxiliary spot B2 are equal and constant. Accordingly, where the spot of light A is located at the center of the track 11, an area of the auxiliary spot B1 to be occupied on the track 11 is equal to an area of the auxiliary spot B2 to be occupied on the track 11. Reflectivity of the track 11 differs from that of the portion on the recording medium 7 where the track 11 is not formed.

The spot of light A and auxiliary spots B1 and B2 are reflected from the recording medium 7 and led to the high frequency optical detectors 9, 10 and 8 corresponding thereto.

The operation of the track deviation detecting mechanism arranged in the manner described above will now be described with reference to FIGS. 1 and 2.

When the projected position of the spot of light A on the track is moved, the auxiliary spots B1 and B2 are moved in the same direction and over the same distance as the spot of light A. Where the spot of light A is located at the center of the track 11 to be read in FIG. 2, the optical detectors 10 and 8 to which the auxiliary spots B1 and B2 are led receive an equal quantity of light since the area of the auxiliary spot B1 to be occupied on the track 11 is equal to the area of the auxiliary spot B2 to be occupied on the track 11.

Where the spot of light A is deviated from the center of the track 11 in FIG. 2, the area of the auxiliary spot B1 occupying the track 11 becomes different from the area of the auxiliary spot B2 occupying the track 11. The reflectivity of the track 11 differs from that of the portion on the recording medium 7 where the track 11 is not formed, as described before. Therefore, the auxiliary spots B1 and B2 are reflected from the recording medium 7 to the optical detectors 10 and 8 corresponding thereto with different quantities of light. Thus, the intensities of the light beams incident on the optical detectors 10 and 8 differ from each other and hence the optical detectors 10 and 8 deliver different electric output signals.

In FIG. 1, the optical detectors 10 and 8 have a differential amplifier 14 connected thereto, so that if the electric output signals from the optical detectors 10 and 8 are amplified by the differential amplifier 14, it is possible to detect the amount and direction of the deviation of the spot of light A from the track to be read.

According to the method described above, there is no inconvenience when a recording medium having information recorded thereon is to be reproduced. However, when information is to be recorded on a recording medium which has not been recorded, the following drawback interferes with normal operation.

This drawback will now be described with reference to FIG. 3. FIG. 3 shows a guide groove 15 called a pregroove on a recording medium, and a spot of light A and auxiliary spots B1 and B2, illustrating their relative position, in accordance with a conventional device. The spot of light A serves to write records. In FIG. 3, the guide groove 15 on the recording medium moves in the direction of arrow X, and the spot of light A forms record pits 16 on the guide groove along the latter. The auxiliary spots B1 and B2 are respectively positioned on the lower and upper edges 13 and 12 of the guide groove 15, the relative position of the spot of light A and auxiliary spots B1 and B2 being the same as that shown in FIG. 2.

In FIG. 3, since the guide groove 15 moves in the direction of arrow X, the auxiliary spot B2 passes over the record pits 16 formed by the spot of light A. On the other hand, the auxiliary spot B1 is always projected on the unrecorded portion where the record pits 16 are not formed. The reflectivity of the record pit 16 differs from that of the unrecorded portion where the record pits 16 are not formed. Thus, even if the writing light spot A is positioned at the center of the guide groove, that is, even if it is in the normal writing position, the quantity of light reflected from the auxiliary spot B2 influenced by the record pit 16 differs from the quantity of light reflected from the auxiliary spot B1 not influenced by the record pit 16.

Consequently, the optical detectors 10 and 8 of FIG. 1 respectively associated with the auxiliary spots B1 and B2 will have their outputs influenced. That is, despite the fact that the amount of deviation from the track is zero, the output of the differential amplifier 14 connected to the optical detectors 10 and 8 does not become zero. Further, in this case, since the output from the differential amplifier 14 depends also on the density of the record pits 16, i.e., the spacing between the record pits, and on the size of the record pits, electrical compensation of balance is difficult. The method described above, therefore, has the drawback that it cannot be applied to the optical information recording device.

SUMMARY OF THE INVENTION

Accordingly, a principal object of this invention is to provide a track deviation detecting apparatus eliminating the drawback described above.

In brief, this invention is a track deviation detecting apparatus for use with a device having the function of optically making a record on a recording medium having guide grooves, comprising two diffraction grating surfaces for producing at least two auxiliary spots serving to detect a deviation of a spot of light having its image formed on the recording medium from a track, optical means for projecting said auxiliary spots on a unrecorded portion of the track at a position just before said spot of light as viewed in a direction opposite to the direction of travel of the track, and optical detectors installed correspondingly to the respective auxiliary spots and adapted to detect the reflected light rays from said at least two auxiliary spots on the recording medium.

Therefore, according to this invention, when information is to be recorded on an unrecorded recording medium, reflected light rays from at least two auxiliary spots for detection of deviation can be directed to the optical detectors installed correspondingly thereto, without being influenced by the record pits formed by the spot of light. Thus, there is obtained a peculiar effect that the amount and direction of the deviation of the spot of light from the track can be accurately detected.

This and other objects and features of the invention will become more apparent from the following detailed description to be given with reference to the accompanying drawings.

BRIEF DESCRIPTION OF THE DRAWINGS

FIG. 1 is a view showing the mechanism of a conventional optical information reading device;

FIG. 2 is a view showing the disposition of spots of light on a recording medium according to a conventional device;

FIG. 3 is a view showing the disposition of spots of light on a recording medium where a conventional device is applied to a recording device;

DESCRIPTION OF THE PREFERRED EMBODIMENTS

Figure 4:
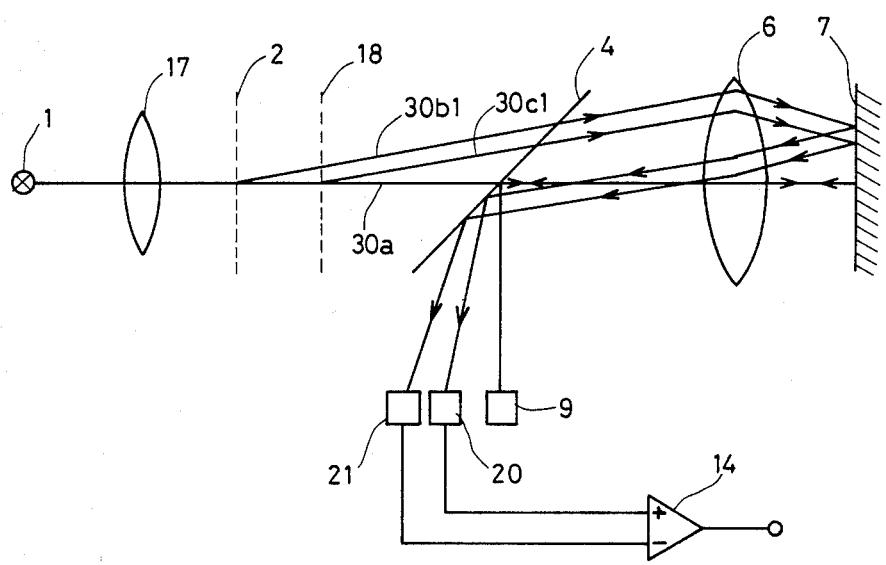
FIG. 4 is a view of the mechanism of an optical recording device having an embodiment of this invention.

FIG. 4 is a view illustrating the mechanism of an optical information recording apparatus equipped with an embodiment of this invention. In this figure, the light emitted from a light source 1 is formed into parallel light rays by a collimator lens 17, and a diffraction grating 2 separates therefrom the diffracted light beam of the plus first order, i.e., the beam shown at a light path 30b 1 (in the figure and in the following description, the light path for the diffracted light beam of the minus first order is omitted). The beam shown at a light path 30c 1 is the diffracted light of the plus first order which is not influenced by the diffraction grating 2 but which has been separated by a diffraction grating 18. The beam shown at a light path 30a is the diffracted light of the zeroth order not influenced by the diffraction gratings 2 and 18.

Figure 5:
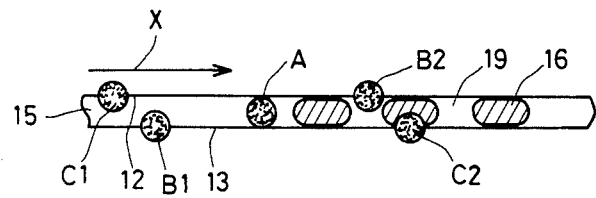
FIG. 5 is a view showing the disposition of spots of light on a recording medium according to this invention.

The beams of light guided along the light paths 30a, 30b 1 and 30c 1 are concentrated as spots of light on the recording medium 7 by a condenser 6. The relative position of the concentrated spots of light and guide groove 15 formed on the recording medium 7 is shown in FIG. 5. The spot of light A for writing records is the diffracted light of the zeroth order not influenced by the diffraction gratings 2 and 18, the auxiliary spots B1 and B2 are the diffracted light of the plus and minus first orders separated by the diffraction grating 2, and the auxiliary spots C1 and C2 are the diffracted light of the plus and minus first orders separated by the diffraction grating 18.

The two diffraction gratings 2 and 18 and optical means comprising the light source 1, collimator lens 17 and condenser 6 are arranged so that these spots have the following positional relationship. That is, in FIG. 5, the auxiliary spot B1 is located on the unrecorded portion of the guide groove 15 and at the lower edge 13 of the guide groove 15, the auxiliary spot B2 is located on the recorded portion of the guide groove 15 and at the upper edge 12 of the guide groove 15, the auxiliary spot C1 is located on the unrecorded portion of the guide groove 15 and at the upper edge 12 of the guide groove 15, and the auxiliary spot C2 is located on the recorded portion of the guide groove 15 and at the lower edge 13 of the guide groove 15.

In FIG. 5, the spot of light A for writing records has its intensity of light modulated for the purpose of writing records. For example, the intensity of light is increased when forming a record pit 16, but at a portion 19 where no record pit will be formed on the guide groove 15 in FIG. 5, it is decreased. With the modulation of the intensity of light for the spot of light A, the intensities of the reflected light rays from the auxiliary spots B1, C1, B2 and C2 are modulated. In addition, the intensities of the reflected light rays from the auxiliary spots B2 and C2 located on the recorded portion of the guide groove 15 are influenced by the record pit 16 and modulated. For example, when the auxiliary spot B2 or C2 is positioned on the record pit 16 shown in FIG. 5, the intensity of light is reduced, but when it is positioned on the portion 19 where a record pit 16 is not formed, the intensity of light is increased.

If the auxiliary spots B2 and C2 subjected to modulation in intensity of light due to the influence of the record pit 16 besides the modulation for writing records are led to their respective optical detectors, the modulation of light intensity as such would influence the output signals from the optical detectors. The signal subjected to this modulation is a time-dependent function of a difference in time taken for the guide groove 15 on the recording medium 7 to move from the position of the spot of light A to the auxiliary spot B2 or C2.

If, therefore, the frequency of the recording signal changes with time, the beats of the frequency corresponding to this change will be included in the output signals from the optical detectors. Generally the frequency of recording signals changes at random, and hence the frequency of beat component changes at random and is possibly included in the frequency band needed for the track follow-up servo. In this case, accurate track follow-up becomes impossible. Therefore, the auxiliary spots B2 and C2 projected on the recorded portion of the guide groove 15 on the recording medium 7 shown in FIG. 5 are not suitable for use for track deviation detection purposes.

For the reason described above, according to this invention, in FIG. 5, the reflected light rays from the auxiliary spots B1 and C1 projected on the unrecorded portion of the guide groove 15 not influenced by the record pits 16 are used and led to the respective optical detectors 20 and 21 shown in FIG. 4. Thus, the deviation of the spot of light A from the track is detected by using the auxiliary spots B1 and C1. The operation for detecting the deviation from the track is substantially the same as that explained in FIG. 2. Accordingly, the outputs from the optical detectors 20 and 21 are differentially amplified by the differential amplifier 14, thereby making it possible to detect the amount and direction of the deviation between the spot of light A and the guide groove 15 without being influenced by the record pits 16.

In addition, in FIG. 5, in order to detect the deviation of the spot of light A from the track more accurately, it is preferable that the positions of the auxiliary spots B1 and C1 be such that they are projected at a position just before the spot of light A as viewed in a direction opposite to the direction of travel of the track.

Further, in the above embodiment, the auxiliary spots B1 and C1 shown in FIG. 5 have been produced by the two diffraction gratings 2 and 18 shown in FIG. 4, but they may be produced by a single diffraction grating (not shown) forming two different spatial frequencies, instead of using two diffraction gratings.

Further, while the above description refers to track deviation detection when records are optically written, the invention is also applicable to track deviation detection when recorded information is read. In this case, since there is no modulation of intensity of light for writing records, track deviation can be detected by using auxiliary spots C1 and B1, B1 and B2, C1 and C2, or B2 and C2 in FIG. 5.

Further, the term "track" as used herein means not only the track where information has been recorded as shown in FIG. 2 but also the guide groove where information is to be newly recorded as shown in FIGS. 3 and 5.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A track deviation detecting apparatus for use with a means for optically making a record on a recording medium having guide grooves, said apparatus comprising
    two diffraction grating surfaces for producing at least two auxiliary spots serving to detect a deviation of a spot of light having its image formed on the recording medium from a track,
    optical means for projecting said auxiliary spots on an unrecorded portion of the track at a position just before said spot of light as viewed in a direction opposite to the direction of travel of the track, and
    optical detectors installed correspondingly to the respective auxiliary spots and adapted to detect the reflected light rays from said at least two auxiliary spots on the recording medium.

2. A track deviation detecting apparatus as set forth in claim 1, wherein each of said two diffraction grating surfaces is formed by a single diffraction grating.

3. A track deviation detecting apparatus as set forth in claim 1, wherein said two diffraction grating surfaces are formed by a single diffraction grating having two different spatial frequencies.

4. A track deviation detecting apparatus as set forth in claim 1, wherein a positional relationship of said two diffraction grating surfaces and said optical means is arranged so that one of said two auxiliary spots is located on said unrecorded portion of the track and at a lower edge of said track and the other of said two auxiliary spots is located on said unrecorded portion of the track and at an upper edge of said track.

5. A track deviation detecting apparatus as set forth in claim 1, wherein said optical detectors are connected to a differential amplifier.

6. A track deviation detecting apparatus as set forth in claim 1, wherein said optical means comprises a light source and a lens.

7. A track deviation detecting apparatus as set forth in claim 1, wherein said auxiliary spots are separated from a beam of light being concentrated as said spot of light on the recording medium.

8. Track deviation detecting apparatus comprising:
    first means radiating a beam towards a recording medium for generating a recording spot on a track of said recording medium,
    second means radiating a beam towards said recording medium for generating a first auxiliary spot transversely displaced from said recording spot along said track in a first direction and displaced from said recording spot longitudinally along said track towards an unrecorded portion thereof,
    third means radiating a beam for generating a second auxiliary spot transversely displaced from said recording spot along said track in a second direction opposite to said first direction and displaced from said recording spot longitudinally along said track towards said unrecorded portion thereof,
    said first, second and third means connected for corresponding displacement transversely to said track, and
    detecting means for detecting beams of said auxiliary spots reflected by said recording medium.

9. Track deviation detecting apparatus as recited in claim 8 further comprising means connected to said detecting means for detecting transverse displacement of said auxiliary spots and for generating control signals for compensating for said transverse displacement.

10. Track deviation detecting apparatus as recited in claim 8 wherein said second and third means comprise a pair of diffraction surface means for generating said auxiliary spots as same polarity orders of diffraction of a source spot.

11. Track deviation detecting apparatus as recited in claim 10 wherein said second and third means each comprise a diffraction surface for generating a plus first order of diffraction.

* * * * *